Patented Nov. 12, 1935

2,020,622

UNITED STATES PATENT OFFICE 2,020,622

ARYLISOTHIAZOLONES AND PROCESS OF MAKING SAME

Norbert Steiger, Frankfort-on-the-Main, and Fritz Schulte, Frankfort-on-the-Main-Fechenheim, Germany, assignors to General Aniline Works, Inc., New York, N. Y., a corporation of Delaware No Drawing. Application December 21, 1932, Serial No. 648,318. In Germany January 20, 1932

8 Claims. (Cl. 260—44)

Our present invention relates to arylene-isothiazolones and to a process of making same.

According to German Patent No. 216,269 arylcyan-o-sulfochlorides are converted into the corresponding o-mercapto-carboxylic acids by treatment with acid reducing agents until the nitrogen is completely split off.

According to U. S. Patents Nos. 1,712,365, 1,712,366 and 1,712,367 the production of o-mercapto-aryl-carboxylic acid amides is rendered possible by a modification of said reduction process by treating a substituted o-cyanaryl-sulfochloride in the presence of a suitable organic solvent with a reducing agent consisting of a metal or metal salt, and a strong mineral or organic acid which also acts as acid hydrolyzing agent, the reaction being regulated so that practically no nitrogen of the cyanic group is split off in the form of ammonia.

In accordance with the present invention it is possible further to modify the reduction process of arylcyan-o-sulfochlorides by diminishing the amount of reactive hydrogen so that quite different heterocyclic products are formed.

For this purpose the reaction is carried out by acting with an amount of a metal reducing agent corresponding to about four reactive hydrogen atoms advantageously with the addition of an acid which does not act as an oxidant and an inert organic diluent at temperatures below about 60° C., care being taken that the reaction is continued only to a point at which a test just fails to show the known mercaptan reaction (yellowish coloration with lead acetate).

Owing to their behaviour, the constitution of isothiazolones, corresponding to the general formula:—

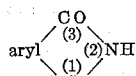

(internal anhydrides of aryl-carboxyamidosulfonic acids)

may be ascribed to the reaction products.

The course of the reaction is then probably according to the following scheme of formulæ:

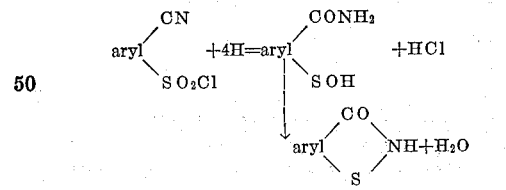

The fundamental body of this series, i. e. the benzoisothiazolone-3 is described in the literature (Berichte der deutschen Chemischen Gesellschaft, vol. 61, page 1308 et seq. and Journ. Chem. Soc., London, vol. 123, page 3310 et seq., in which it is termed 2-thiobenzimide). However, the methods of preparing this compound hitherto used cannot be carried out on a technical scale and are not capable of general application.

In the present process various aryl-cyan-o-sulfo-chlorides of the benzene and naphthalene series which are technically accessible and which contain different substituents in the aromatic nuclei may be employed as starting materials so that this process permits of the manufacture of hitherto unknown substituted isothiazolones of the benzene and naphthalene series, whereas the methods hitherto described in the literature are limited to the production of simple and unsubstituted iso-thiazolones, since initial materials for such processes containing other substituents are not accessible.

The arylene-isothiazolones form colorless, well defined, crystalline substances which are easily soluble in dilute caustic alkali solutions with the formation of alkali salts which may be isolated from the solutions, for example, by adding an excess of the caustic alkali solution and which likewise have a well defined crystalline form.

The arylene-isothiazolones are generally stable compounds which are not decomposed, for example, by boiling with caustic alkali solution.

The isothiazolones of the probable general formula

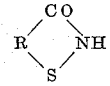

wherein R stands for a substituted benzo or naphthalene radical, are new compounds. The isothiazolones corresponding to the probable general formula

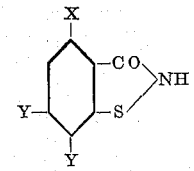

wherein X means alkyl or hydrogen, Y halogen or an alkoxy-group, are of particular value.

In order to further illustrate our invention the following examples are given, the parts being by weight and all temperatures in centigrade degrees, but it is however to be understood that our invention is not limited to the particular products nor reacting conditions mentioned therein.

Example 1

54 parts of the sodium salt of 1-methyl-2-cyan-5-chloro-benzene-3-sulfonic acid are converted into the sulfo-chloride by boiling with 80 parts of phosphorus pentachloride in the presence of about 200 parts of chlorobenzene. To the solution of the sulfochloride thus formed, at about 10°, ice is slowly added, and while well stirring, 35 parts of zinc dust are slowly added, care being taken that the temperature of the reaction mass does not exceed 60° and the aforesaid test just fails to show the mercaptan reaction. After having distilled off the chlorobenzene, the residual mass is stirred with dilute hydrochloric acid and then filtered off. The 4-methyl-6-chloro-benzo-isothiazolone-3 of the probable formula:

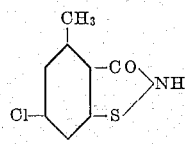

thus formed is an almost colorless, well defined crystalline substance which is easily soluble in a dilute caustic soda solution and likewise in hot sodium carbonate solution and is precipitated from the alkaline solutions by acidification. When crystallized from chloro-benzene it melts at about 220°.

Example 2

123 parts of 1-ethoxy-4-cyan-benzene-5-sulfochloride are dissolved in about 400 parts of chlorobenzene, 200 parts of a sulfuric acid of 50% strength and during about an hour 95 parts of zinc dust are added, care being taken that the temperature of the reaction mass does not exceed 60°. The reaction mass is stirred for about an hour at this temperature, until the aforesaid test indicates the moment of interrupting the reaction. Then the chlorobenzene is distilled off in vacuo, the residue is diluted with water and filtered off. For purification it is dissolved in a hot dilute caustic soda solution and to the solution thus obtained an excess of a strong concentrated caustic soda solution is added, whereby the sodium salt of the new compound separates in crystals after a short time. It is redissolved in hot water, the solution thus obtained is freed from some impurities in a given case by filtration and the filtrate is acidified. The 6-ethoxy-benzo-isothiazolone-3 of the probable formula:

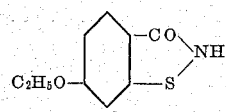

thus obtained represents a colorless, crystalline substance. It crystallizes from alcohol in the form of needles of about 225° melting point and is easily soluble in a caustic soda solution. By adding to such a solution an excess of a concentrated caustic soda solution the sodium salt separates as a well defined crystalline substance.

In the same manner there may be obtained by reducing cyanbenzene-o-sulfochloride the benzo-isothiazone-3 of the probable formula:

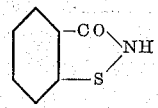

which shows the properties described in the above cited literature and represents in a pure state colorless crystals of 157–158° melting point, and by reducing the naphthalene-2-cyan-1-sulfochloride the naphthisothiazolone-3 of the probable formula:

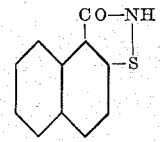

which represents in a pure state colorless crystals of about 205° melting point.

Instead of sulfuric acid likewise hydrochloric acid or glacial acetic acid and instead of zinc other metallic reducing agents, such as tin, may be used.

With the same result bigger quantities of the reducing agents may be used only care being taken that the reaction is interrupted before the aforesaid test indicates the entrance of the mercaptan reaction. The adapted moment can be easily determined by previous tests.

We claim:

1. A process for producing arylene-isothiazolones which comprises acting on arylcyan-o-sulfochlorides of the benzene and naphthalene series in a non-oxidizing acid medium with an amount of a metal reducing agent corresponding to about four reactive hydrogen atoms, care being taken that the reaction is continued only to a point at which a test just fails to show the known mercaptan reaction.

2. A process for producing benzo-isothiazolones corresponding to the general formula:

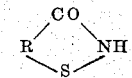

wherein R stands for a benzeno radical substituted by halogen, alkyl or an alkoxy group, which comprises acting on substituted phenyl cyan-o-sulfochlorides of the general formula

wherein R has the aforesaid signification, in a non-oxidizing acid medium at temperatures below about 60° with an amount of a metal reducing agent corresponding to about four reactive hydrogen atoms, care being taken that the reaction is continued only to a point at which a test just fails to show the known mercaptan reaction.

3. A process for producing benzo-isothiazolones corresponding to the general formula

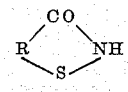

wherein R stands for a benzeno radical substituted by halogen, alkyl or an alkoxy group, which comprises acting on substituted phenyl cyan-o-sulfochlorides of the general formula

wherein R has the aforesaid signification, with an amount of a metal reducing agent corresponding to about four reactive hydrogen atoms with the addition of an inert, organic solvent and a non-oxidizing acid at temperatures below about 60°, care being taken that the reaction is continued only to a point at which a test just fails to show the known mercaptan reaction.

4. Benzo-isothiazolones corresponding to the general formula:

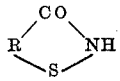

wherein R stands for a benzeno radical, substituted by halogen, alkyl or an alkoxy group, which products represent in a pure state colorless, crystalline substances which are easily soluble in dilute caustic alkali solutions.

5. Benzo-isothiazolones corresponding to the general formula

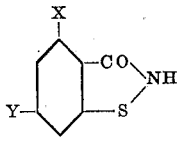

wherein X means alkyl or hydrogen, Y halogen or an alkoxy-group, which products represent in a pure state colorless, crystalline substances which are easily soluble in dilute caustic alkali solutions.

6. The 4-methyl-6-chloro-benz-isothiazolone-3 of the formula

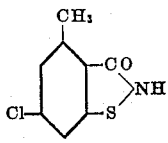

which represents a colorless, crystalline substance of about 220° melting point, which product is easily soluble in a dilute caustic soda solution.

7. The 6-ethoxy-benz-isothiazolone-3 of the formula

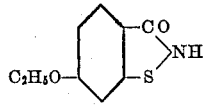

which represents a colorless crystalline substance of about 225° melting point, which product is easily soluble in a dilute caustic soda solution.

8. Arylene-isothiazolones corresponding to the general formula:

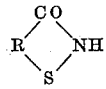

wherein R stands for an aryl radical of the group consisting of naphthylene and phenylene, said radical being substituted by halogen, alkyl or an alkoxy group, which products represent in a pure state colorless, crystalline substances which are easily soluble in dilute caustic alkali solution.

NORBERT STEIGER.
FRITZ SCHULTE.